United States Patent
Cox et al.

(10) Patent No.: US 10,453,035 B2
(45) Date of Patent: Oct. 22, 2019

(54) GATHERING AND MINING DATA ACROSS A VARYING AND SIMILAR GROUP AND INVOKING ACTIONS

(71) Applicant: International Business Machines Corporation, Armonk, NY (US)

(72) Inventors: Susan M. Cox, Rochester, MN (US); Janani Janakiraman, Austin, TX (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 1441 days.

(21) Appl. No.: 13/656,500

(22) Filed: Oct. 19, 2012

(65) Prior Publication Data

US 2014/0114710 A1    Apr. 24, 2014

(51) Int. Cl.
*G06Q 10/10* (2012.01)
*G06Q 30/04* (2012.01)

(52) U.S. Cl.
CPC ........... *G06Q 10/107* (2013.01); *G06Q 30/04* (2013.01)

(58) Field of Classification Search
CPC ...... G06Q 10/06; G06Q 30/04; G06Q 10/107; G06Q 30/0246; G06Q 30/0201; G06Q 20/102; G06C 30/0246; G06C 30/0201; G06C 20/102; B07C 7/005; B07C 2301/005; B07C 2301/0083; G05B 2219/2671; G05B 2219/33209; Y10S 209/90; B65H 2301/4311; H04L 63/0227
USPC ........................................................ 705/7.13
See application file for complete search history.

(56) References Cited

U.S. PATENT DOCUMENTS

| | | | | |
|---|---|---|---|---|
| 5,121,945 A * | 6/1992 | Thomson | ........... | B42D 15/0053 283/58 |
| 5,465,206 A * | 11/1995 | Hilt | ........ | G06Q 20/02 705/40 |
| 6,029,195 A * | 2/2000 | Herz | ...... | G06Q 30/02 725/116 |
| 6,343,327 B2 * | 1/2002 | Daniels, Jr. | .......... | G06Q 10/107 709/239 |
| 6,508,365 B1 * | 1/2003 | Cacace-Bailey | .......... | B07C 3/00 209/584 |
| 6,934,691 B1 * | 8/2005 | Simpson | .............. | G06Q 20/102 382/101 |
| 2001/0044776 A1 * | 11/2001 | Kight | ..................... | G06Q 20/04 705/40 |
| 2002/0035697 A1 * | 3/2002 | McCurdy | ................ | G06F 21/10 726/3 |

(Continued)

*Primary Examiner* — Tyler W Knox
(74) *Attorney, Agent, or Firm* — Peter K. Suchecki (57) ABSTRACT

A system includes a distribution center for scanning mail intended for and received from clients in a community. The mail scanned for generating sender, recipient, type, and arrival data. Category data is generated and includes a payables category, a donation category, and a printed matter category. Client preferences data is also generated. The data is mined to find commonalities of mail sent to and received from clients. An action is invoked based on the mined data and it is determined that the action is a payables, donation, or printed matter action. If the action is either a payables or donation action then, a client and a third party are notified prior to execution of the action. If the action is a printed matter action then, then a printed matter shared by more than one client is presented for sharing.

15 Claims, 5 Drawing Sheets

(56) References Cited

U.S. PATENT DOCUMENTS

| | | | |
|---|---|---|---|
| 2002/0120581 A1* | 8/2002 | Schiavone | G06Q 10/107 705/64 |
| 2002/0129111 A1* | 9/2002 | Cooper | G06Q 10/107 709/207 |
| 2002/0165729 A1* | 11/2002 | Kuebert | G06Q 10/08 705/338 |
| 2003/0074411 A1* | 4/2003 | Nale | H04N 1/00127 709/206 |
| 2003/0191711 A1* | 10/2003 | Jamison et al. | 705/40 |
| 2004/0111181 A1* | 6/2004 | Pintsov | G06Q 10/10 700/224 |
| 2004/0122682 A1* | 6/2004 | Gruber | G06Q 10/10 705/34 |
| 2004/0139011 A1* | 7/2004 | Kozee | G06Q 20/102 705/40 |
| 2004/0162795 A1* | 8/2004 | Dougherty | G06Q 10/107 706/20 |
| 2004/0193491 A1* | 9/2004 | Davis | G06Q 30/02 705/14.17 |
| 2005/0027392 A1* | 2/2005 | Elliot | G07B 17/00362 700/227 |
| 2005/0240433 A1* | 10/2005 | Schwartz | G06Q 30/02 705/329 |
| 2006/0004642 A1* | 1/2006 | Libman | G06Q 10/10 705/14.49 |
| 2006/0041590 A1* | 2/2006 | King | H04N 1/00244 |
| 2006/0167834 A1* | 7/2006 | Rubel, Jr. | G06Q 10/107 |
| 2006/0253405 A1* | 11/2006 | Nirenberg | G06Q 50/32 705/401 |
| 2007/0043846 A1* | 2/2007 | Grayson | G06Q 10/06 709/223 |
| 2007/0055581 A1* | 3/2007 | Block | G06Q 10/087 705/26.7 |
| 2008/0033845 A1* | 2/2008 | McBride | G06Q 10/087 705/28 |
| 2008/0033875 A1* | 2/2008 | Cinelli | G06Q 10/107 705/40 |
| 2008/0104178 A1* | 5/2008 | Agrawal | G06Q 10/107 709/206 |
| 2008/0104179 A1* | 5/2008 | Agrawal | G06Q 10/107 709/206 |
| 2008/0225052 A1* | 9/2008 | Alston-Hughes | G06F 1/1616 345/522 |
| 2008/0228587 A1* | 9/2008 | Slaney | G06Q 30/02 705/14.71 |
| 2009/0084713 A1* | 4/2009 | Miller | B07C 3/00 209/584 |
| 2009/0157555 A1* | 6/2009 | Biffle et al. | 705/67 |
| 2010/0100436 A1* | 4/2010 | Phifer | G06Q 10/107 705/14.49 |
| 2010/0161484 A1* | 6/2010 | Leggatt | G06Q 20/10 705/40 |
| 2010/0217613 A1* | 8/2010 | Kelly | G06Q 30/02 705/1.1 |
| 2011/0087746 A1* | 4/2011 | Sagi | G06Q 10/107 709/206 |
| 2011/0098846 A1 | 4/2011 | Yeung et al. | |
| 2012/0011068 A1* | 1/2012 | Dearing | G06Q 10/083 705/50 |
| 2012/0136780 A1* | 5/2012 | El-Awady | G06Q 20/102 705/40 |
| 2012/0191585 A1* | 7/2012 | Lefebvre | G06Q 10/10 705/35 |
| 2012/0191603 A1* | 7/2012 | Nuzzi | G06Q 20/102 705/40 |
| 2012/0203676 A1* | 8/2012 | Chou | 705/30 |
| 2012/0323717 A1* | 12/2012 | Kirsch | G06Q 20/0855 705/26.1 |
| 2013/0073455 A1* | 3/2013 | McLaughlin et al. | 705/40 |
| 2013/0291060 A1* | 10/2013 | Moore | G06F 21/6245 726/1 |
| 2013/0325713 A1* | 12/2013 | Yeri | G06Q 40/02 705/42 |
| 2015/0302366 A1* | 10/2015 | Khan | G06Q 20/10 705/42 |

* cited by examiner

GATHERING AND MINING DATA ACROSS A VARYING AND SIMILAR GROUP AND INVOKING ACTIONS

BACKGROUND

The present invention relates generally to physically handling mail and, in particular, to scanning mail to generate data, categorizing and mining the data, and invoking actions to a group of similar clients.

Retirement communities, such as housing complexes where senior citizens reside, are typically inundated with mail or post. As humans age our brains experience diminished functionality, which can impede our decision making ability. This potentially reduced decision making ability may make it difficult for senior citizens to perform daily tasks such as sorting through mail, paying bills, and managing their finances. Due to their presumed wealth and potential reduced decision making ability, senior citizens are susceptible to attempts to defraud them.

Other communities, such as a university where there are a large number of young adults for example, may also find it difficult to perform daily or weekly monetary, or similar, tasks for any number of reasons. For example, time constraints and inexperience can make it difficult for young adults to adequately manage their finances.

Communities such as a senior citizens complex or university often have a mail distribution center. Incoming mail is received, sorted, and processed at the distribution center and then sent to the intended recipients in the community. Similarly, outgoing mail is received at the distribution center from recipients in the community and then processed and sent out.

Incoming and outgoing mail may be scanned at the mail distribution center for capturing sender and recipient information and generating representative data. The mail may also be scanned for category and frequency of mail delivered to recipients in the community to generate representative data. The data gathered, or mined, by the mail distribution center may be used by the distribution center, or other entities, to optimize efficiency of the mail delivery service.

For example, mail management information may be synthesized from data associated with mail items. Addresses, including with addressee names, is synthesized from data collected from mail items. Confidence information indicating a measure of confidence that each synthesized address is a valid address is also generated from the collected data. Intelligence functions may be provided to enhance address synthesis capabilities. Input data for synthesis of mail management information may include data collected from physical mail items, other mail management information, or both. Features such as service delivery compliance management, network proficiency management, delivery route proficiency management, customer compliance management, a visibility service, address cleansing, delivery notification, addressee verification, synthesis of statistics, and/or synthesis of behavioral patterns could be implemented from the synthesized data.

BRIEF SUMMARY

In one embodiment, a method that comprises scanning incoming and outgoing mail for generating sender data, recipient data, type data, and arrival data. The method continues with generating category data and mining the data to find commonalities among more than one client. The method then invokes an action for at least one client based on the mined data. The method invokes one of a payables action, a donation action, and a printed matter action. If the invoked action comprises one of a payables action and a donation action then, at least one of the client and a third party are notified prior to execution of the invoked action. If the invoked action comprises a printed matter action then at least one client of receipt of printed matter is notified.

In another embodiment a method that comprises scanning mail intended for and received from clients in a community. The mail is scanned for generating sender data, recipient data, type data, and arrival data. The method continues with generating category data based on type data, then generating client preferences data for at least one client in the community. The client preferences data includes third party data, automatic payment data, and printed matter data for each of the at least one client in the community. The data is mined to find commonalities of clients in the community. The method then invokes an action for at least one client based on the mined data. The method continues with determining if an action to be invoked is one of a payables action, a donation action, and a printed matter action. If the action to be invoked comprises one of a payables action and a donation action then, at least one of the client and a third party are notified prior to execution of the action, if a determined frequency is greater than a threshold. If the action to be invoked comprises a printed matter action then, it is determined if a printed matter is shared by more than one client in the community. If the printed matter is shared by more than one client then, a printed matter action is invoked where more than one client is notified of receipt of the printed matter for sharing the printed matter.

In a further embodiment, a system that comprises a distribution center for scanning mail intended for and received from clients in a community, where at least two clients in the community are similar. The mail is scanned for generating sender data, recipient data, type data, and arrival data. The distribution center includes a controller. The controller generates category data based on type data, with the category data including a payables category, a donation category, and a printed matter category. The category data is then stored in a database. Client preferences data for at least two clients in the community is generated, with the client preferences data including third party data, automatic payment data, and printed matter data for each of the at least two clients in the community. The data is mined to find commonalities of mail sent to and received from clients in the community. The system then invokes an action for at least one client based on the mined data and determined commonalities. The system then determines if an action to be invoked is one of a payables action, a donation action, and a printed matter action. If the action to be invoked is one of a payables action and a donation action then, at least one of the client and a third party are notified prior to execution of the action if a determined frequency is greater than a threshold. If the action to be invoked is a printed matter action then, the system determines if a printed matter is shared by more than one client in the community. If the printed matter is shared by more than one client then, a printed matter action is invoked where more than one client is notified of receipt of the printed matter for sharing the printed matter.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In one embodiment, a method that comprises scanning incoming and outgoing mail for generating sender data, recipient data, type data, and arrival data. The method continues with generating category data and mining the data to find commonalities among more than one client. The method then invokes an action for at least one client based on the mined data. The method invokes one of a payables action, a donation action, and a printed matter action. If the invoked action comprises one of a payables action and a donation action then, at least one of the client and a third party are notified prior to execution of the invoked action. If the invoked action comprises a printed matter action then at least one client of receipt of printed matter is notified.

In another embodiment a method that comprises scanning mail intended for and received from clients in a community. The mail is scanned for generating sender data, recipient data, type data, and arrival data. The method continues with generating category data based on type data, then generating client preferences data for at least one client in the community. The client preferences data includes third party data, automatic payment data, and printed matter data for each of the at least one client in the community. The data is mined to find commonalities of clients in the community. The method then invokes an action for at least one client based on the mined data. The method continues with determining if an action to be invoked is one of a payables action, a donation action, and a printed matter action. If the action to be invoked comprises one of a payables action and a donation action then, at least one of the client and a third party are notified prior to execution of the action, if a determined frequency is greater than a threshold. If the action to be invoked comprises a printed matter action then, it is determined if a printed matter is shared by more than one client in the community. If the printed matter is shared by more than one client then, a printed matter action is invoked where more than one client is notified of receipt of the printed matter for sharing the printed matter.

In a further embodiment, a system that comprises a distribution center for scanning mail intended for and received from clients in a community, where at least two clients in the community are similar. The mail is scanned for generating sender data, recipient data, type data, and arrival data. The distribution center includes a controller. The controller generates category data based on type data, with the category data including a payables category, a donation category, and a printed matter category. The category data is then stored in a database. Client preferences data for at least two clients in the community is generated, with the client preferences data including third party data, automatic payment data, and printed matter data for each of the at least two clients in the community. The data is mined to find commonalities of mail sent to and received from clients in the community. The system then invokes an action for at least one client based on the mined data and determined commonalities. The system then determines if an action to be invoked is one of a payables action, a donation action, and a printed matter action. If the action to be invoked is one of a payables action and a donation action then, at least one of the client and a third party are notified prior to execution of the action if a determined frequency is greater than a threshold. If the action to be invoked is a printed matter action then, the system determines if a printed matter is shared by more than one client in the community. If the printed matter is shared by more than one client then, a printed matter action is invoked where more than one client is notified of receipt of the printed matter for sharing the printed matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of describing the embodiments disclosed herein, two elements are considered to be coupled when one element is able to send an electrical signal to another element. The electrical signal may represent, for example but not limited to, data, operating commands, status information, or electrical power, or any combination of these electrical signals. A coupling may be implemented by wired or wireless connection means.

Figure 1:
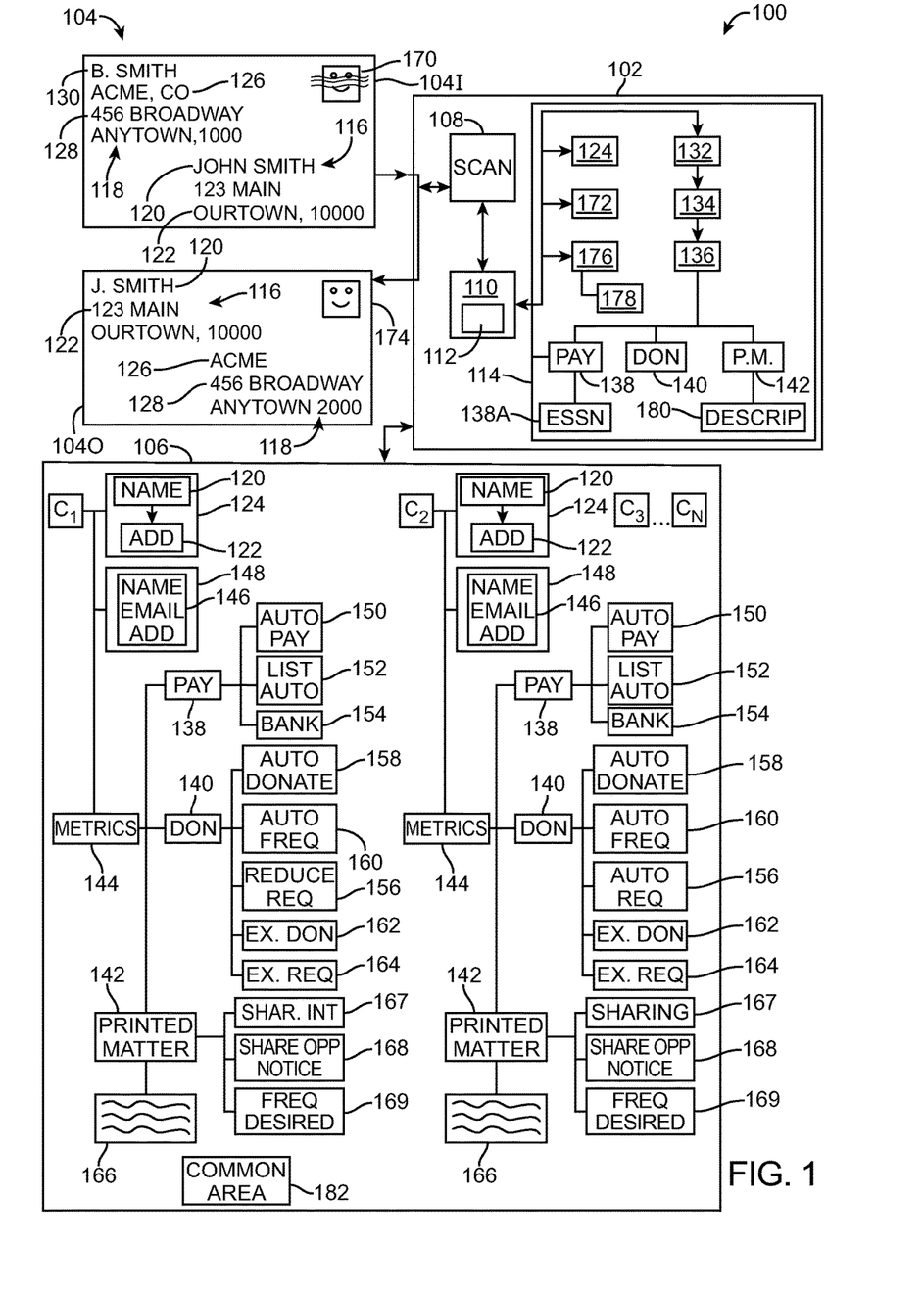
FIG. 1 is a functional block diagram showing an exemplary embodiment of a system of the invention.

Referring now to FIG. 1 there is shown, generally at 100, an exemplary embodiment of a system for gathering and mining data across a varying and similar group and invoking actions. In one embodiment, the system 100 includes a distribution center 102 that receives and sends mail 104 for a community 106. As discussed herein, the community 106 may comprise a group of persons of any size whose members may reside in a specific locality and/or have defined connections to the community 106. For example, while members of the community 106 may, or may not, reside in a specific locality, they perform business with, participate in activities, and interact substantially with the community 106. Most importantly members of the community 106, as defined herein, receive and send mail 104 via the distribution center 102.

In some embodiments, the community 106 may comprise a group of persons of any size whose members may reside in a specific locality, have defined connections to the community 106, such as a known retirement community, where older adults, or seniors, send and receive mail 104 via the distribution center 102. Another exemplary community 106 may be a college or university, where one or more of faculty, staff, and students attending the college or university are members of the community 106. Additional examples of what the community 106 may comprise will become immediately apparent to those of ordinary skill in the art.

In some embodiments, the community 106, such as those discussed above, comprises a group of persons, where at least two persons in the community 106, and potentially many more, are similar. As can be appreciated, in such a community 106, the persons comprising the community 106 are constantly and continually changing for numerous reasons. Thus, in one exemplary embodiment, the community 106 comprises a group of persons, where at least two persons in the community 106 are similar, they are constantly and continually changing, and they send and receive mail 104 via the distribution center 102. Hereinafter, persons in the community 106 will be referred to as clients $C_1$, $C_2$, $C_3$ . . . $C_N$ for ease of discussion only.

In one preferred embodiment, the distribution center 102 sends and receives mail 104 for clients $C_1$, $C_2$, $C_3$ . . . $C_N$ in the community 106. As discussed herein, it is to be understood that "mail" may comprise any postal material typically associated with the word "mail" including written communications, such as letters, packages, magazines and other periodicals, newspapers, and other printed communications and materials handled in a postal system. It is also to be understood that mail 104, as defined herein, may refer to both a single piece of post and multiple pieces of post. It is further to be understood, that the postal system may comprise either a governmental or private mail carrier, parcel post, or parcel shipping service or organization.

In one embodiment, the distribution center 102 comprises a mail distribution center, such as a suitable mail distribution center known in the art. The distribution center 102 provides processing and distribution of incoming mail 104I and outgoing mail 104O to the community 106. The distribution center 102 may include persons and machinery (both not shown) for receiving, distributing, and sending mail 104. In one embodiment, the distribution center 102 includes a scanner 108 for scanning incoming mail 104I and outgoing mail 104O, and a computer 110, that includes a controller 112, coupled to the scanner 108. The computer 110 controls processing and distributing incoming mail 104I and outgoing mail 104O to the community 106. A database 114 is coupled to the computer 110 for storing and retrieving data.

Figure 2:
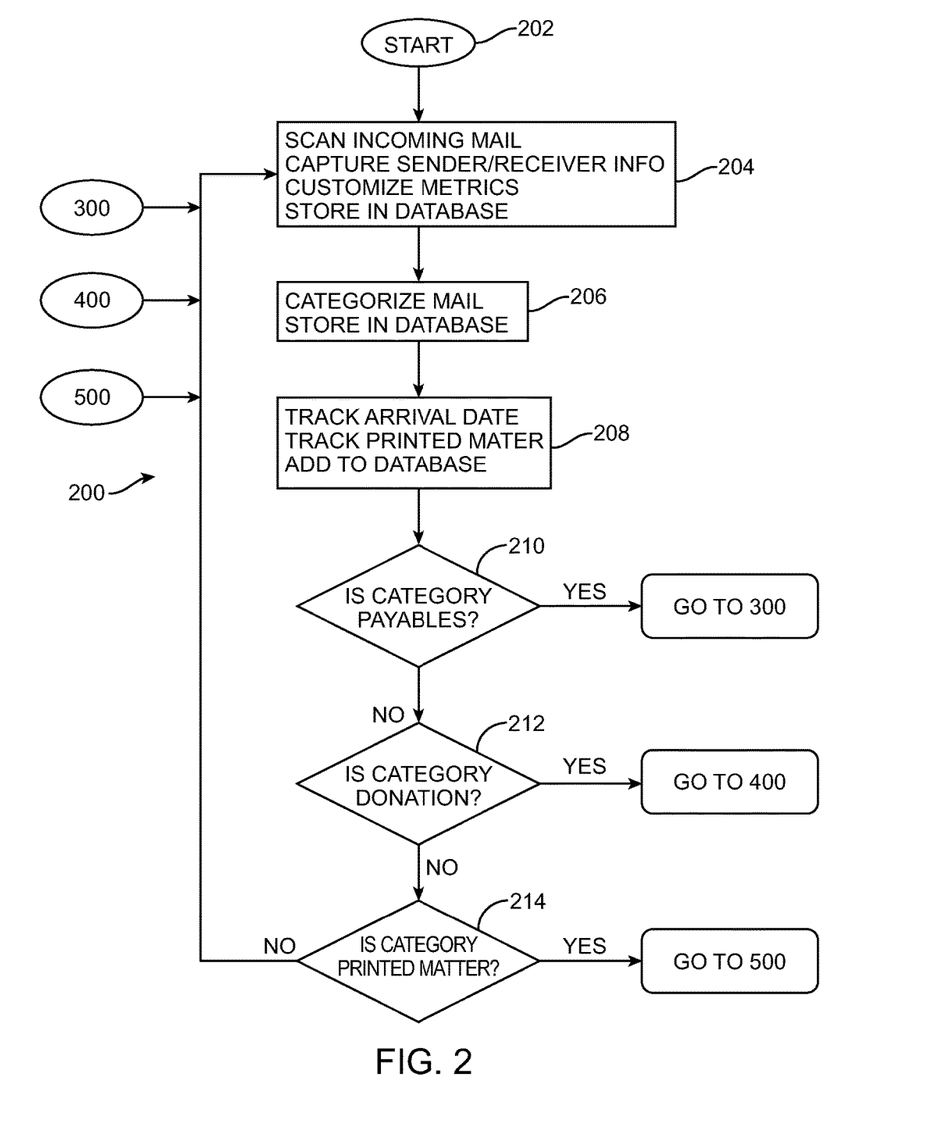
FIG. 2 is a flowchart showing an exemplary method for gathering and mining data across a varying and similar group and invoking actions in accordance with an embodiment of the invention.

As illustrated in FIG. 1 and FIG. 2, incoming mail 104I is received by the distribution center 102 and scanned by the scanner 108. The incoming mail 104I is scanned for client contact information 116 and sender, or organization information 118. The client contact information 116 is scanned for client name 120, client address 122, and any additional client information. The client contact information 116 is processed by the computer 110 for generating client data 124 that is stored in the database 114. Organization information 118 is scanned for company or organization 126, hereinafter organization 126 for ease of discussion only, organization address 128, and other information. Optionally, the organization information 118 may be scanned for an individual's name 130. After scanning, the organization information 118 is processed by the computer 110 for generating organization data 132. The organization data 132 is mined to determine the "type" organization, type data 134 is generated and stored in the database 114.

In some embodiments of the invention, the type data 134 is mined for determining what category of an action to be invoked and completed to which the organization 126 belongs. Once it is determined to which category of action to be invoked and completed the organization 126 belongs, category data 136 is generated and stored in the database 114.

In an exemplary embodiment, several different categories of actions to be invoked and completed are generated from the category data 136. In one preferred embodiment, the different categories of actions to be invoked and completed comprise a payables category 138, a donation category 140, and a printed matter category 142. It is to be understood that embodiments of the invention may comprise additional categories, as desired, and that the label given each category in this discussion, such as "payables" is purely arbitrary, and for ease of discussion only.

In some embodiments, each client $C_1, C_2, C_3 \ldots C_N$ in the community 106 is provided with a customizable set of preferences, or metrics 144, for determining how actions in each category 138, 140, 142 are to be invoked and completed depending on each organization 126. Additionally, each client $C_1, C_2, C_3 \ldots C_N$ may provide the distribution center 102 with contact information 146 for a third party 148. The contact information 146 may comprise a name, email address, telephone number, physical address, or other relevant contact information. Typically, the third party 148 will be an entity closely associated with the client $C_1$, such as a friend or family member, and may have some measure of control over a portion, or all, of the client's affairs. The third party 148 may be contacted in various situations, such as ensuring that mail, such as mail in the payables category 138, is being responded to timely or for any other obvious reasons.

In one embodiment, metrics 144 that optionally may relate to the payables category 138 include configuring automatic payment of a monthly payable 150. A monthly payable 150 may comprise a monthly bill such as a utilities bill, telephone bill, or medical insurance premium. Another metric 144 for the payables category 138 may comprise configuring a list of essential monthly payables 152 for automatic payment. A list of essential monthly payables 152 configured for automatic payment may include telephone and utilities bills, an auto loan payment, and medical insurance premium, for example. Other optional metrics 144 for the payables category 138 may comprise providing payment information 154. In some embodiments, the payment information 154 may include bank account number for paying payables, account numbers of payables being paid, the client's signature, any other information needed for automatic payment, and third party contact information 146.

In some embodiments, optional metrics 144 that may relate to the donation category 140 may include: reducing donation requests 156; permitting automatic reduction of donation requests 158; configuring automatic donation action frequency 160 determined by at least one of the client $C_1$ and third party 148; and contacting the third party 148 if it appears that the client $C_1$ is donating excessively 162, such as donating at a frequency greater than the frequency 160 determined by either or both of the client $C_1$ and third party 148. Another metric 144 that may relate to the donation category 140 may comprise contacting the third party 148 if it appears that the client $C_1$ is receiving excessive donation requests 164 from a specific donatee. As defined herein, a donatee may comprise any entity that receives, or attempts to receive, funds from another entity such as one or more clients $C_1, C_2, C_3 \ldots C_N$ in the community 106. Thus, a donatee may comprise any of numerous known charitable organizations and may also comprise unscrupulous persons or organizations attempting to defraud one or more clients $C_1, C_2, C_3 \ldots C_N$ in the community 106.

In some embodiments, optional metrics 144 that may relate to the printed matter category 142 may include determining if the client $C_1$ has an interest in printed matter sharing 167, where a particular printed matter 166 such as a newspaper, magazine, weekly publication, or other periodical, is shared with other clients $C_2, C_3 \ldots C_N$ in the community 106. Sharing a printed matter 166 with other clients $C_2, C_3 \ldots C_N$ may result in reduced use of printed matter, reduced paper waste, and environmental improvements. Other optional metrics 144 that may relate to the printed matter category 142 may comprise: notifying the client that there is a sharing opportunity 168 for sharing a printed matter 166; and determining what a desired frequency 169 of an incoming matter 166 may be for the client $C_1$. It will be readily apparent to a person of ordinary skill in the art that the metrics 144 discussed above are exemplary only and that many different and beneficial metrics 144 may be generated and are not limited to the metrics 144 discussed above.

In the above metrics 144, the client $C_1$ has the option to choose whether or not to permit an action to occur, such as automatic payment of a payable 150. Most metrics 144 do not occur, unless the client $C_1$ chooses to permit the action, such as automatic payment of a payable 150, to occur, by default. Thus, a client $C_1$ choosing to permit an action to occur, indicates that the client $C_1$ has chosen to "opt-in" for the particular action.

In some preferred embodiments, the payables category 138 is provided for inhibiting a client $C_1, C_2, C_3 \ldots C_N$ from misplacing, forgetting, or otherwise not timely responding to important payables. Similarly, the donation category 140 is provided for inhibiting a client $C_1, C_2, C_3 \ldots C_N$ from excessively donating assets or for donating assets to unscrupulous or illegitimate causes, or both. The printed matter category 142 may be provided for reducing printed matter 144 to clients $C_1, C_2, C_3 \ldots C_N$ in the community 106. For example, if more than a threshold number of clients $C_1, C_2, C_3 \ldots C_N$ in the community 106 receive the same printed matter 166, clients $C_1, C_2, C_3 \ldots C_N$ that receive the printed matter 166 are encouraged to share. Examples of printed matter 166 that may be shared by more than one client $C_1, C_2, C_3 \ldots C_N$ in the community 106 include newspapers, weekly publications, magazines, periodicals, and other printed matter 166 to which more than client $C_1, C_2, C_3 \ldots C_N$ may subscribe.

As illustrated in FIG. 1, a postmark 170 of the incoming mail 104I may be scanned and processed by the computer 110 for generating arrival data 172 that is stored in the database 114. The arrival data 172 is used for determining when incoming mail 104I is received by the distribution center 102. The arrival data 172 is also compared to departure data, thoroughly discussed hereinafter, for determining frequency of payables, donation requests, and other actions.

Referring to FIG. 1 and FIG. 2, FIG. 2 illustrates a flow diagram of an exemplary embodiment of a process for gathering and mining data across a varying and similar group and invoking actions, in accordance with the invention. The process 200 starts with start block 202. In process block 204, incoming mail 104I is received by the distribution center 102. As incoming mail 104I is received, each piece of mail 104I is scanned for client contact information 116 and organization information 118. The client contact information 116 is processed by the computer 110 for generating client data 124 and storing the data 124 in the database 114. The client data 124 on the incoming mail 104I is compared against client data 124 existing in the database 114 for determining that the client is in the community 106. Simultaneously, the organization information 118 is processed for generating organization data 132 and type data 134.

In process block 206, the type data 134 is processed for generating category data 136 and determine to which category, payables 138, donation 140, and printed matter 142, the incoming mail 104I belongs. Upon determining the category, the category data 136 is stored in the database 114. The process 200 continues to process block 208, where the postmark 170 is scanned for generating arrival data 148 that is stored in the database 114.

Figure 3:
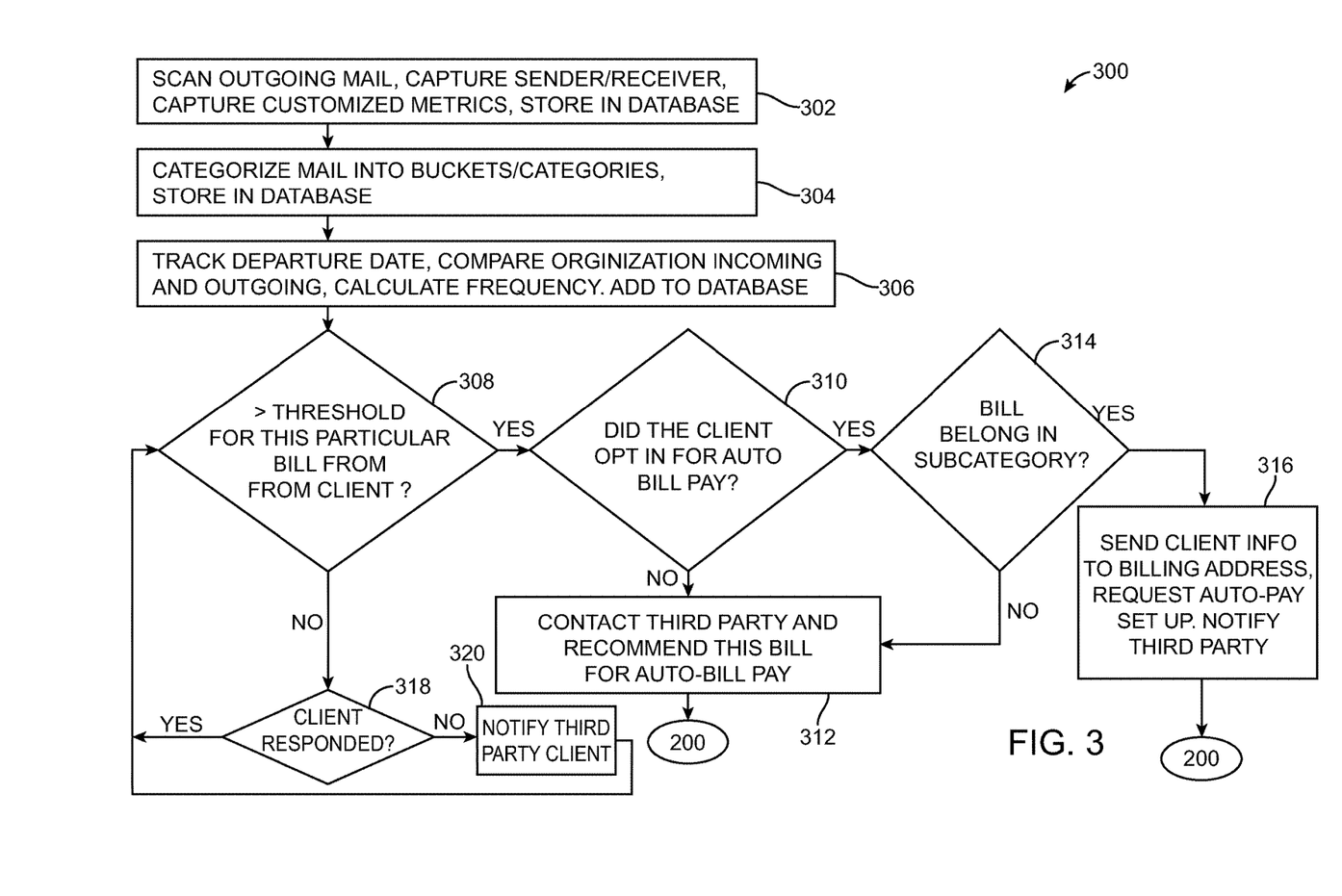
FIG. 3 is a flowchart showing an exemplary method for determining if an action to be invoked is a payables action and for processing the payables action.

Referring to FIGS. 1-3, and particularly to FIG. 3, a flow diagram of an exemplary embodiment of a process for determining if an action to be invoked is a payables action and invoking the action, is shown generally at 300. In some embodiments, the payables category 138 is provided for inhibiting a client $C_1$, $C_2$, $C_3$ . . . $C_N$ from misplacing, forgetting, or otherwise not timely responding to important payables. In decision block 210, of FIG. 2, the category data 136 for a piece of incoming mail 104I is mined for determining if the piece of incoming mail 104I for a client $C_1$ is from an organization 126 in the payables category 138. If the piece of incoming mail 104I is not from an organization 126 in the payables category 138, then the process 200 continues to decision block 212. If the piece of incoming mail 104I is from an organization 126 in the payables category 138, the process 200 continues to process block 302, shown in FIG. 3.

In process block 302, a piece of outgoing mail 104O is scanned for client contact information 116 and organization information 118. The client contact information 116 is compared to the metrics 144 that are specific to that particular client $C_1$ and organization 126. In process block 304, the organization information 118 is processed for determining if the organization 126 belongs in a subcategory, such as an essentials subcategory 138A of the payables category 138.

A departure date 174, indicating the date that the distribution center 102 sent the outgoing mail 104O is recorded for generating departure data 176 that is stored in the database 114, in process block 306. The departure data 176 is compared against the arrival data 172 to generate frequency data 178. Frequency data 178 is then used to track how frequently the particular organization 126 is sending mail 104I to a particular client $C_1$ and how often the client $C_1$ is sending mail 104O to the organization 126. Once the frequency data 178 is generated, it is stored in the database 114.

The process 300 then continues to decision block 308, where the frequency data 178 is processed for determining the frequency that the organization 126 is sending mail 104I to a client $C_1$ and how often the client $C_1$ is sending mail 104O to the organization 126. If it is determined that either the organization 126 is sending mail 104I to a client $C_1$ at a frequency above a threshold or the client $C_1$ is sending mail 104O to the organization 126 at a frequency above a threshold, or both, the process 300 continues to decision block 310.

In decision block 310, the metrics 144 in the payables category 138 for the client $C_1$ are searched. The client's metrics 144 are searched for determining if the client $C_1$ did opt-in for automatic payment of payables to the organization 126. If the client $C_1$ did not opt-in for automatic payment to the organization 126, the process 300 continues to process block 312. In process block 312, the client's third party 148 is notified and it is recommended that automatic payment for the payable to the organization 126 be configured. The client $C_1$ may also be notified of the recommendation. The process 300 then returns to process block 204, shown in FIG. 2.

Returning to decision block 310 in FIG. 3, if it is determined that the client $C_1$ did opt-in for automatic payment to the organization 126, the process 300 continues to decision block 314 where it is determined if the payable to the organization 126 is to be categorized into a subcategory 138A of the payables category 138, such as an essentials subcategory 138A. In some embodiments, payables in the essentials subcategory 138A may include monthly bills such as the client's telephone bill, utilities bill, and medical insurance premiums, as previously discussed. If it is determined that the payable is not to be categorized into the essentials subcategory 138A, then the process 300 returns to process block 312.

If it is determined that the payable is to be categorized into the essentials subcategory 138A, then the process 300 continues to process block 316. In process block 316, the distribution center 102 sends client data 124 to the organization 126 requesting configuration of automatic payment of the payable. In some embodiments, the payment information 154 for the client $C_1$, third party contact information 146, and any other information necessary for configuring automatic payment of the payable are sent to the distribution center 102. The distribution center 102 then completes configuring automatic payment of the payable and the client's third party 148 is notified by the distribution center 102, the client $C_1$ may also be notified. The process 300 then returns to process block 204, shown in FIG. 2.

Returning to decision block 308, if it is determined that the organization 126 is not sending mail 104I to a client $C_1$ at a frequency above a threshold or the client $C_1$ is not sending mail 104O to the organization 126 at a frequency above a threshold, or both, the process 300 continues to decision block 318. In decision block 318, it is determined if client $C_1$ has not responded to payable from the organization 126 within a predetermined time period. If the client $C_1$ has not responded within the time period, the third party 148 and client are notified, at process block 320. The process 300 then returns to decision block 308. If the client $C_1$ has responded with in the time period, the process 300 then returns to decision block 308.

Figure 4:
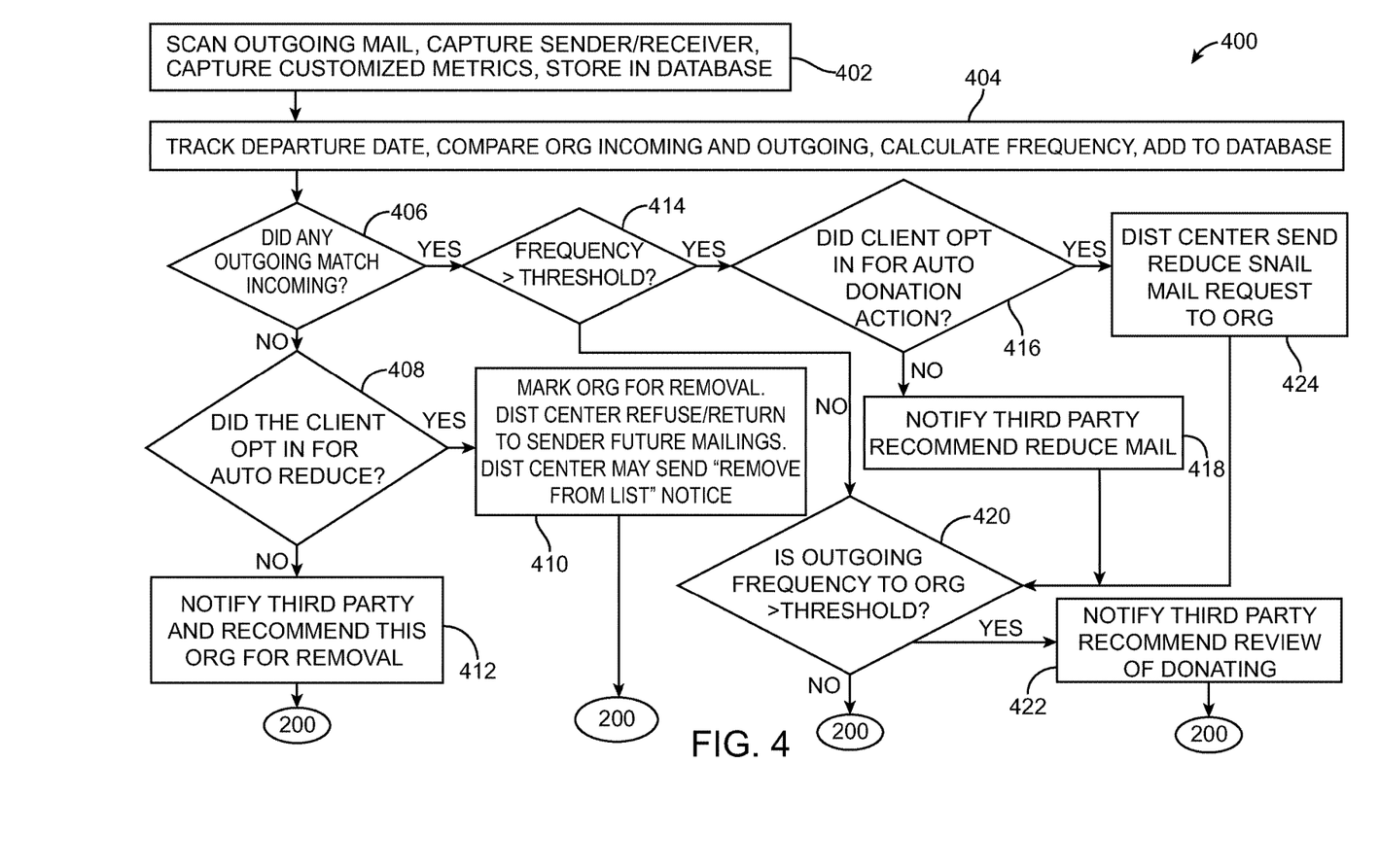
FIG. 4 is a flowchart showing an exemplary method for determining if an action to be invoked is a donation action and for processing the donation action.

Referring to FIG. 1, FIG. 2, and FIG. 4, and particularly to FIG. 4, a flow diagram of an exemplary embodiment of a process for determining if an action to be invoked is a donation action and invoking the action, is shown generally at 400. In one embodiment, the donation category 140 is provided for inhibiting a client $C_1$, $C_2$, $C_3$ ... $C_N$ from excessively donating assets or for donating assets to unscrupulous or illegitimate causes, or both. In decision block 212, of FIG. 2, the category data 136 for a piece of incoming mail 104I is mined for determining if the piece of incoming mail 104I for a client $C_1$ is from an organization 126 in the donation category 140. If the piece of incoming mail 104I is not from an organization 126 in the donation category 140, then the process 200 continues to decision block 214. If the piece of incoming mail 104I is from an organization 126 in the donation category 140, then the process 200 continues to process block 402, shown in FIG. 4.

In process block 402, a piece of outgoing mail 104O is scanned for client contact information 116 and organization information 118. The client contact information 116 is compared to the metrics 144 that are specific to that particular client $C_1$ and organization 126.

In process block 404, a departure date 174, indicating the date that the distribution center 102 sent the outgoing mail 104O is recorded for generating departure data 176 that is stored in the database 114, in process block 404. The departure data 176 is compared against the arrival data 172 to generate frequency data 178 that is used to track how frequently the particular organization 126 is sending mail 104I to the client $C_1$ and how often the client $C_1$ is sending mail 104O to the organization 126. Once the frequency data 178 is generated, it is stored in the database 114.

The process 400 then continues to decision block 406, where it is determined if the client $C_1$ ever responded to a donation request by the organization 126. If it is determined that the client $C_1$ never responded to a donation request by the organization 126, the process 400 continues to decision block 408, where it is determined if the client $C_1$ decided to opt-in for automatic reduction of mail received from the organization 126. The client's donation metrics, such as reducing donation requests 156, permitting automatically reduction of donation requests 158, configuring automatic donation action frequency 160, and any other donation metrics 144 are searched for determining if the client $C_1$ decided to opt-in for automatic reduction of mail received from the organization 126. If the client $C_1$ decided to opt-in for automatic reduction of mail received from the organization 126, then the process 400 continues to process block 410 and if the client $C_1$ did not opt-in for automatic reduction of mail received from the organization 126, then the process 400 continues to process block 412.

In process block 410 the distribution center 102 is requested to designate the organization 126 for removal. The distribution center 102 may then refuse and/or return any incoming mail 104I from the organization 126 intended for the client $C_1$. The distribution center 102 may also contact the organization 126 and request that the client $C_1$, and additional clients $C_1$, $C_2$, $C_3$ ... $C_N$ in the community 106, be removed from future mailings from the organization 126. The process 400 then returns to process block 204.

Returning to process block 412, in one embodiment, the third party 148, and potentially the client $C_1$, is contacted by the distribution center 102 that recommends the organization 126 for removal. The distribution center 102 may then refuse and/or return any incoming mail 104I from the organization 126 intended for the client $C_1$, at the consent of the third party 148. The process 400 then returns to process block 204.

Returning to decision block 406, if it is determined that the client $C_1$ responded to a donation request by the organization 126, the process 400 continues to decision block 414. In decision block 414 it is determined if the organization 126 is sending mail 104I to the client $C_1$ at a frequency above a threshold. If the organization 126 is sending mail 104I to the client $C_1$ at a frequency above the threshold, then the process 400 continues to decision block 416, where the client's donation metrics, such as automatic donation action frequency 160, and any other donation metrics 144 are searched for determining if the client $C_1$ did opt-in for automatic donation action 160. If the client $C_1$ did not opt-in for automatic donation action 160, then the distribution center 102 notifies the client's third party 148 of an opportunity for an automatic donation action to reduce mail 104I sent to client $C_1$ from the organization 126, in process block 418. The process 400 then continues to decision block 420.

Returning to decision block 414, if it is determined that the organization 126 is sending mail 104I to the client $C_1$ at a frequency lower than the threshold, the process 400 then continues to decision block 420. In decision block 420 it is determined if client $C_1$ is sending mail 104O to the organization 126 at frequency above the threshold. If the client $C_1$ is not sending mail 104O to the organization 126 at frequency above the threshold, the process 400 returns to process block 204 in FIG. 2. If the client $C_1$ is sending mail 104O to the organization 126 at frequency above the threshold, the process 400 continues to process block 422. In process block 422, the third party 148 is notified by the distribution center 102 that the client $C_1$ is sending mail 104O to the organization 126 at frequency above the threshold. The third party 148 may then intervene to prevent the client $C_1$ from making excessive donations. The process 400 then returns to process block 202 in FIG. 2. Returning to decision block 416, if it is determined that the client $C_1$ did opt-in for an automatic donation action 160, the distribution center 102 sends a request to the organization 126 to reduce incoming mail 104I to the client $C_1$, in process block 424. The process 400 then continues to decision block 420.

Figure 5:
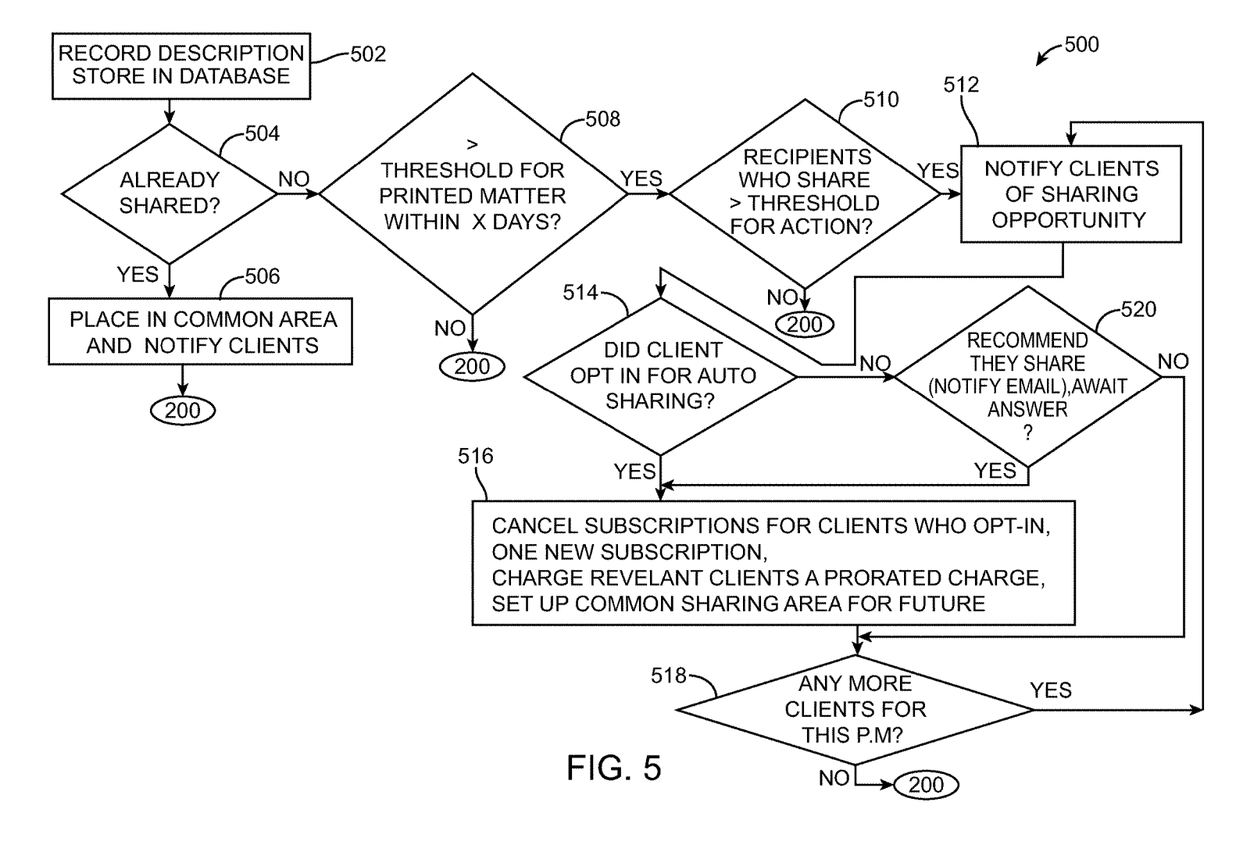
FIG. 5 is a flowchart showing an exemplary method for determining if an action to be invoked is a printed matter action and for processing the printed matter action.

Referring to FIG. 1, FIG. 2, and FIG. 5, and particularly to FIG. 5, a flow diagram of an exemplary embodiment of a process for determining if an action to be invoked is a printed matter action and invoking the action, is shown generally at 500. The printed matter category 142 may be provided for reducing printed matter 166 to clients $C_1$, $C_2$, $C_3$ ... $C_N$ in the community 106, and thus reducing waste. For example, if more than a threshold number of clients $C_1$, $C_2$, $C_3$ ... $C_N$ in the community 106 receive the same printed matter 166, clients $C_1$, $C_2$, $C_3$ ... $C_N$ that receive the printed matter 166 are encouraged to share the printed matter 166. Examples of printed matter 166 that may be shared by more than one client $C_1$, $C_2$, $C_3$ ... $C_N$ in the community 106 include newspapers, weekly publications, magazines, periodicals, and other printed matter 166 to which more than client $C_1$, $C_2$, $C_3$ ... $C_N$ may subscribe.

In decision block 214, of FIG. 2, the category data 136 it is determined at an incoming mail 104I for a client $C_1$ is in the printed matter category 142. If the piece of incoming mail 104I is not in the printed matter category 142, then the process 200 returns process block 204. If the piece of incoming mail 104I is in the printed matter category 142 then the process 200 continues to process block 502, shown in FIG. 5.

In process block 502, a piece of incoming mail 104I comprising the printed matter 166 is scanned and its description 180 recorded and stored in the database 114. The printed matter's description 180 may comprise a magazine, journal, other periodical, newspaper, and other printed matter 166. Once it is determined what type of printer matter that the printed matter 166 comprises, the process 500 continues to decision block 504, where it is determined if the printed matter 166 is already shared by more than one client $C_1$, $C_2$, $C_3$ ... $C_N$ in the community 106. If the printed matter 166 is already shared by more than one client $C_1$, $C_2$, $C_3$ ... $C_N$, then the process continues to process block 506, where the printed matter 166 is placed in a common area 182 of the community 106, such as in a library or recreation center. The clients $C_1$, $C_2$, $C_3$ ... $C_N$ who share the printed matter 166 are then notified that it was received and it is available for their use. The process 500 then returns to process block 204, in FIG. 2.

Returning to decision block 504, if it is determined that the printed matter 166 is not shared by more than one client $C_1$, $C_2$, $C_3$ ... $C_N$, then the process continues to decision block 508. In decision block 508 it is determined if more than a threshold minimum number of clients $C_1$, $C_2$, $C_3$ ... $C_N$ for the particular printed matter 166 receive the printed matter 166, and within a predetermined time frame. If it is determined that the number of clients $C_1$, $C_2$, $C_3$ ... $C_N$ who receive the particular printed matter 166 within the predetermined time frame is less than threshold minimum number of clients $C_1$, $C_2$, $C_3$ ... $C_N$, the process 500 then returns to process block 204, in FIG. 2. Alternatively, the predetermined time frame may be increased to exceed the threshold minimum number of clients $C_1$, $C_2$, $C_3$ ... $C_N$ that receive the printed matter 166, and it can again be determined if more than a threshold minimum number of clients $C_1$, $C_2$, $C_3$ ... $C_N$ for the particular printed matter 166 receive it.

If it is determined that more than a threshold minimum number of clients $C_1$, $C_2$, $C_3$ ... $C_N$ for the particular printed matter 166 receive the printed matter 166, the process 500 continues to decision block 510. In decision block 510 it is determined if more than a threshold minimum number of clients $C_1$, $C_2$, $C_3$ ... $C_N$ for the particular printed matter 166 have elected, using their metrics 144, to opt-in for sharing the printed matter 166. The metrics 144 for clients $C_1$, $C_2$, $C_3$ ... $C_N$ who receive the printed matter 166 are searched to determine if the clients $C_1$, $C_2$, $C_3$ ... $C_N$ have elected to opt-in for sharing the printed matter 166. If it is determined that the number of clients $C_1$, $C_2$, $C_3$ ... $C_N$ who have elected to opt-in for sharing the printed matter 166 is less than the threshold, then the process 500 then returns to process block 204, in FIG. 2. If it is determined that the number of clients $C_1$, $C_2$, $C_3$ ... $C_N$ who have elected to opt-in for sharing the printed matter 166 greater than the threshold, then the process 500 then continues to process block 512.

In process block 512 each client $C_1$, $C_2$, $C_3$ ... $C_N$ who receives the printed matter 166 is then notified, using their client contact information 116, that there is an opportunity to share a particular printer matter 166, and the process 500 continues to decision block 514. In decision block 514, it is determined if a client $C_1$, $C_2$, $C_3$ ... $C_N$ who received notification of a sharing opportunity for the particular printer matter 166 did opt-in for sharing the printed matter 166. If the client $C_1$, $C_2$, $C_3$ ... $C_N$ did opt-in for sharing the printed matter 166, the process 500 continues to process block 516.

In process block 516, subscriptions to the printed matter 166 for those clients $C_1$, $C_2$, $C_3$ ... $C_N$ who have elected to opt-in to sharing the printed matter 166 are canceled. The distribution center 102 then subscribes to the printed matter 166 and the costs and fees for the subscription to the printed matter 166 are distributed among the clients $C_1$, $C_2$, $C_3$ ... $C_N$ that share the printed matter 166. Upon receipt of the printed matter 166 by the distribution center, the clients $C_1$, $C_2$, $C_3$ ... $C_N$ who share the printed matter 166 are notified that the printer matter was received and it is available for their use in the common area 182.

The process 500 then continues to decision block 518, where it is determined if there are any additional clients $C_1$, $C_2$, $C_3$ ... $C_N$ who receive the particular printed matter 166. If there are not any additional clients $C_1$, $C_2$, $C_3$ ... $C_N$ who receive the particular printed matter 166, the process 500 returns to process block 204, in FIG. 2. If there are additional clients $C_1$, $C_2$, $C_3$ ... $C_N$ who receive the particular printed matter 166, the process 500 returns to process block 512.

Returning to decision block 514, if the client $C_1$, $C_2$, $C_3$ ... $C_N$ did not opt-in for sharing the printed matter 166, it is recommended that they share the printed matter 166, in decision block 520, and their answer is awaited. If the client $C_1$, $C_2$, $C_3$ ... $C_N$ decides to not opt-in for sharing the printed matter 166 the process 500 continues to decision block 518. If the client $C_1$, $C_2$, $C_3$ ... $C_N$ decides to opt-in for sharing the printed matter 166, process 500 continues to process block 516.

In one preferred embodiment system that comprises a distribution center for scanning mail intended for and received from clients in a community, where at least two clients in the community are similar has been described. The mail is scanned for generating sender data, recipient data, type data, and arrival data. The controller generates category data based on type data, with the category data including a payables category, a donation category, and a printed matter category that is stored in a database. Client preferences data for at least two clients in the community is generated, with the client preferences data including third party data, automatic payment data, and printed matter data for each of the at least two clients in the community. The data is mined to find commonalities of mail sent to and received from clients in the community. The system then invokes an action for at least one client based on the mined data and determined commonalities. The system then determines if an action to be invoked is one of a payables action, a donation action, and a printed matter action. If the action to be invoked is one of a payables action and a donation action then, at least one of the client and a third party are notified prior to execution of the action if a determined frequency is greater than a threshold. If the action to be invoked is a printed matter action then, the system determines if a printed matter is shared by more than one client in the community. If the printed matter is shared by more than one client then, a printed matter action is invoked where more than one client is notified of receipt of the printed matter for sharing the printed matter.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:
1. A method comprising:
  scanning mail intended for and received from clients in a community in which the clients live in physical proximity, the mail scanned by a scanner located in a distribution center within the community when the mail intended for the clients is received in the community and when the mail received from the clients is sent from the community for generating sender data, recipient data, type data, and arrival data;
  generating category data based on type data;

generating client preferences data for at least one client in the community, the client preferences data including third party data, automatic payment data, and printed matter data for each of the at least one client in the community;

mining the data to find commonalities of clients in the community; and invoking an action for at least one client based on the mined data, invoking the action comprising:

determining if an action to be invoked is any one of a payables action, a donation action, and a printed matter action;

if the action to be invoked comprises a payables action, if a determined frequency at which the client receives payables mail from a biller third party that sent the payables mail is greater than a threshold, and if the client has opted in for auto pay of bills to which the payables mail relate, sending the biller third party information regarding the client and a request to the biller third party to set up auto pay for the client as to the bills, reducing the payables mail that the client receives from the biller third party, the biller third party setting up the auto pay for the client as to the bills;

if the action to be invoked comprises a donation action, if a determined frequency at which the client receives donation request mail from a charity third party is greater than the threshold, and if the client has opted in for auto pay of donations to which the donation request mail relate, sending the charity third party a notification requesting that the charity reduce the donation request mail that the client receives from the charity third party, reducing the donation request mail that the client receives from the charity third party, the charity reducing the donation request mail that the client receives from the charity third party; and if the action to be invoked comprises a printed matter action then, determining if a printed matter is received by each of more than one client in the community;

if the printed matter is received by each of more than one client that each presently subscribe to the printed matter then, and if the more than one client have opted-in for sharing the printed matter, reducing an amount of the printed matter that is received as mail within the community by:

cancelling a subscription of each of the more than one client to the printed matter by sending a subscription service provider a first notification requesting that the subscription service provider cancel the printed matter that each of the more than one client receives, wherein the first notification causes the subscription service provider to physically update client information to cancel the subscription of the printed matter for each of the more than one client, wherein each of the more than one client subsequently no longer receive an individual copy of the printed matter as mail within the community;

subscribing a single subscription of the printed matter that the more than one client then share by sending a subscription service provider a second notification requesting that the subscription service provider create the single subscription of the printed matter, wherein the costs and fees for the single subscription are billed to the more than one client by the subscription service provider;

subsequently receiving a single copy of the printed matter as mail within the community, pursuant to the single subscription, such that the single copy is received instead of a copy for each of the more than one client;

notifying each of the more than one client that the single copy of the printed mail was received pursuant to the single subscription, and is available for use by the more than one client within a common area of the community, wherein invocation of the one of the payables action, the donation action, and the printed matter action reduces an amount of mail received within the community.

2. The method of claim 1, further comprising:

mining the data for determining if an action to be invoked is a payables action; if the action to be invoked is a payables action then, mining the data for a particular payable;

determining at least one of recipient frequency and client frequency for the particular payable;

determining if at least one of the recipient frequency and client frequency is greater than a threshold for the particular payable;

if at least one of the recipient frequency and client frequency is greater than the threshold for the particular payable then:

determining if the particular payable is configured for automatic payment;

if the particular payable is not configured for automatic payment, then notifying at least one of the client and third party and recommending that the particular payable be configured for automatic payment;

if at least one of the recipient frequency and client frequency is less than the threshold for the particular payable then:

determining if the client paid the particular payable within a predetermined time period; and if the client did not pay the particular payable within the predetermined time period, then notifying at least one of the client and a third party prior and recommending that the particular payable be configured for automatic payment.

3. The method of claim 2, further comprising:

mining the data for determining if the particular payable is a member of a subcategory;

if the particular payable is a member of a subcategory then, configuring the particular payable for automatic payment; and notifying at least one of the client and third party that automatic payment for the particular payable is configured.

4. The method of claim 1, further comprising:

mining the data for determining if an action to be invoked is a donation action;

if the action to be invoked is a donation action then, mining the data for determining if a donatee exists in a database;

if the donatee does not exist in the database then, determining if the donatee is to be added to the database;

if the donatee is not to be added to the database then, notifying at least one of the client and a third party prior to execution of the donation action that the donatee does not exist in the database and the donation action should be canceled and that future mail from the donatee should be blocked; and if the donatee is to be added to the database then, adding the donatee to the database.

5. The method of claim 4, further comprising:
determining that a donatee of a donation action exists in the database;
determining if a donatee frequency is greater than a threshold; if the donate frequency is greater than the threshold then, determining if the donatee is configured for automatic donation action;
if the donatee is configured for automatic donation action then, requesting that the donatee reduce mail sent to client; and
if the donatee frequency is greater than a threshold then, notifying at least one of the client and third party that the donatee frequency is greater than the threshold prior to execution of the donation action.

6. The method of claim 5, further comprising:
if the donatee frequency is greater than the threshold then, notifying at least one of the client and third party that the donatee frequency is greater than the threshold prior to execution of the donation action;
requesting that the donatee be configured for automatic donation action; configuring the donatee for automatic donation action; and
requesting that the donatee reduce mail sent to client.

7. The method of claim 1, further comprising:
mining the data for determining if an action to be invoked is a printed matter action;
determining if a particular printed matter is received by more than one client in the community;
if the particular printed matter is received by more than one client in the community then, determining if the particular printed matter is shared by more than one client;
if the particular printed matter is shared by more than one client, then notifying the more than one client that the printed matter was received by the community and presenting the printed matter for sharing; and
if the particular printed matter is not shared by more than one client then, determining if the particular printed matter is received by greater than a threshold quantity of clients in the community;
if the particular printed matter is received by greater than the threshold quantity of clients in the community, then notifying clients that receive the particular printed matter that there is a sharing opportunity and recommending that the clients share the particular printed matter.

8. The method of claim 7, further comprising:
determining clients in the community that receive the particular printed matter; and
terminating receipt of excessive copies of the particular printed matter such that clients that receive the particular printed matter share a single copy of the particular printed matter.

9. A system comprising:
a distribution center for scanning mail intended for and received from clients in a community in which the clients live in physical proximity, where at least two clients in the community are similar, the mail scanned by a scanner located in the distribution center within the community when the mail intended for the clients is received in the community and when the mail received from the clients is sent from the community for generating sender data, recipient data, type data, and arrival data, the distribution center including:
a controller, the controller:
generating category data based on type data, the category data including a payables category, a donation category, and a printed matter category; storing the category data in a database;
generating client preferences data for at least two clients in the community, the client preferences data including third party data, automatic payment data, and printed matter data for each of the at least two clients in the community;
mining the data to find commonalities of mail sent to and received from clients in the community; and
invoking an action for at least one client based on the mined data and determined commonalities, invoking the action comprising:
determining if an action to be invoked comprises any one of a payables action, a donation action, and a printed matter action;
if the action to be invoked comprises a payables action, if a determined frequency at which the client receives payables mail from a biller third party that sent the payables mail is greater than a threshold, and if the client has opted in for auto pay of bills to which the payables mail relate, sending the biller third party information regarding the client and a request to the biller third party to set up auto pay for the client as to the bills, reducing the payables mail that the client receives from the biller third party, the biller third party setting up the auto pay for the client as to the bills;
if the action to be invoked comprises a donation action, if a determined frequency at which the client receives donation request mail from a charity third party is greater than the threshold, and if the client has opted in for auto pay of donations to which the donation request mail relate, sending the charity third party a notification requesting that the charity reduce the donation request mail that the client receives from the charity third party, reducing the donation request mail that the client receives from the charity third party, the charity reducing the donation request mail that the client receives from the charity third party; and
if the action to be invoked comprises a printed matter action then, determining if a printed matter is received by each of more than one client in the community;
if the printed matter is received by each of more than one client that each presently subscribe to the printed matter then, and if the more than one client have opted-in for sharing the printed matter, reducing an amount of the printed matter that is received as mail within the community by:
cancelling a subscription of each of the more than one client to the printed matter by sending a subscription service provider a first notification requesting that the subscription service provider cancel the printed matter that each of the more than one client receives, wherein the first notification causes the subscription service provider to physically update client information to cancel the subscription of the printed matter for each of the more than one client, wherein each of the more than one client subsequently no longer receive an individual copy of the printed matter as mail within the community;
subscribing a single subscription of the printed matter that the more than one client then share by sending a subscription service provider a second notification requesting that the subscription service provider create the single subscription of the printed matter, wherein the costs and fees for the single subscription are billed to the more than one client by the subscription service provider;

subsequently receiving a single copy of the printed matter as mail within the community, pursuant to the single subscription, such that the single copy is received instead of a copy for each of the more than one client;

notifying each of the more than one client that the single copy of the printed mail was received pursuant to the single subscription, and is available for use by the more than one client within a common area of the community, wherein invocation of the one of the payables action, the donation action, and the printed matter action reduces an amount of mail received within the community.

10. The system of claim 9, further comprising:

mining the data for determining if an action to be invoked is a payables action;

if the action to be invoked is a payables action then, mining the data for a particular payable;

determining at least one of recipient frequency and client frequency for the particular payable;

determining if at least one of the recipient frequency and client frequency is greater than a threshold;

if at least one of the recipient frequency and client frequency is greater than the threshold then, determining if the particular payable is configured for automatic payment; and if the particular payable is not configured for automatic payment, then the distribution center recommending that the particular payable be configured for automatic payment and notifying at least one of the client and third party prior.

11. The system of claim 10, further comprising:

mining the data for determining if the particular payable is a member of a subcategory;

if the particular payable is a member of a subcategory then, the distribution center configuring the particular payable for automatic payment; and notifying at least one of the client and third party that automatic payment for the particular payable is configured.

12. The system of claim 9, further comprising:

mining the data for determining if an action to be invoked is a donation action;

if the action to be invoked is a donation action then, mining the data for determining if a donatee exists in a database;

if the donatee does not exist in the database then, the distribution center determining if the donatee is to be added to the database;

if the donatee is not to be added to the database then, notifying at least one of the client and a third party prior to execution of the donation action that the donatee does not exist in the database and the donation action should be canceled and that future mail from the donatee should be blocked; and if the donatee is to be added to the database then, adding the donatee to the database.

13. The system of claim 12, further comprising:

determining that a donatee of a donation action exists in the database;

determining if a donatee frequency is greater than a threshold;

if the donatee frequency is greater than the threshold then, determining if the donatee is configured for automatic donation action;

if the donatee is configured for automatic donation action then, requesting that the donatee reduce mail sent to client; and notifying at least one of the client and third party that the donatee frequency is greater than the threshold prior to execution of the donation action;

requesting that the donatee be configured for automatic donation action; configuring the donatee for automatic donation action; and requesting that the donatee reduce mail sent to client.

14. The system of claim 9, further comprising:

mining the data for determining if an action to be invoked is a printed matter action;

determining if a particular printed matter is received by more than one client in the community;

if the particular printed matter is received by more than one client in the community then, if the particular printed matter is not shared by more than one client then, the distribution center determining if the particular printed matter is received by greater than a threshold quantity of clients in the community;

if the particular printed matter is received by greater than the threshold quantity of clients in the community, the distribution center then notifying clients that receive the particular printed matter that there is a sharing opportunity and recommending that the clients share the particular printed matter.

15. The system of claim 14, further comprising:

the distribution center determining clients in the community that receive the particular printed matter; and terminating receipt of excessive copies of the particular printed matter such that clients that receive the particular printed matter share a single copy of the particular printed matter.

* * * * *